US008266588B2

(12) United States Patent
Abdelhadi et al.

(10) Patent No.: US 8,266,588 B2
(45) Date of Patent: Sep. 11, 2012

(54) CREATING PROJECTS IN A RATIONAL APPLICATION DEVELOPER WORKSPACE

(75) Inventors: Sanaa F. Abdelhadi, Richardson, TX (US); Jennifer Lee Carlucci, Mission Viejo, CA (US); Guoyou Chen, Austin, TX (US); Rene Ruben Martinez, Cedar Park, TX (US); David Wa-Wai Nip, Hopewell Junction, NY (US); Danling Shi, Austin, TX (US); Philip Kincheloe Warren, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1338 days.

(21) Appl. No.: 11/938,556

(22) Filed: Nov. 12, 2007

(65) Prior Publication Data

US 2009/0125874 A1 May 14, 2009

(51) Int. Cl.
G06F 9/44 (2006.01)
(52) U.S. Cl. .................. 717/120; 717/107; 717/115
(58) Field of Classification Search .................. None
See application file for complete search history.

(56) References Cited

U.S. PATENT DOCUMENTS

| | | | |
|---|---|---|---|
| 6,178,546 B1 * | 1/2001 | McIntyre ................ 717/115 |
| 6,237,135 B1 | 5/2001 | Timbol |
| 6,993,773 B2 | 1/2006 | Broussard |
| 7,000,238 B2 | 2/2006 | Nadler et al. |
| 7,003,759 B2 * | 2/2006 | Jameson ................ 717/120 |
| 7,222,333 B1 * | 5/2007 | Mor et al. ............... 717/115 |
| 7,506,308 B2 * | 3/2009 | Woollen et al. .......... 717/120 |
| 7,614,040 B2 * | 11/2009 | Wagner et al. ........... 717/120 |
| 7,640,533 B1 * | 12/2009 | Lottero et al. ........... 717/108 |
| 2002/0199170 A1 * | 12/2002 | Jameson ................ 717/120 |
| 2003/0121024 A1 * | 6/2003 | Hill et al. ................ 717/107 |
| 2003/0200532 A1 * | 10/2003 | Gensel ................... 717/120 |
| 2005/0251796 A1 * | 11/2005 | Poelman et al. ......... 717/163 |
| 2007/0050705 A1 | 3/2007 | Liu et al. |
| 2007/0226731 A1 * | 9/2007 | Tseitlin et al. .......... 717/171 |
| 2008/0196004 A1 * | 8/2008 | Choi et al. ............... 717/107 |

OTHER PUBLICATIONS

Parkin, S., Rapid Java and J2EE Development with IBM WebSphere Studio and IBM Rational Developer [online], 2004, [retrieved Nov. 4, 2011], Retrieved from Internet: <http://www.s7.com/pdfs/wp-radrwd-medres.pdf>, pp. 1-44.*

(Continued)

Primary Examiner — Don Wong
Assistant Examiner — Todd Aguilera
(74) Attorney, Agent, or Firm — Yee & Associates, P.C.; David A. Mims, Jr.

(57) ABSTRACT

Automatically creating a current project in an application developer workspace is provided. In response to reading a project file for the current project, it is automatically determined whether the current project has one or more dependent projects based on data contained within the project file. In response to determining that the current project does have one or more dependent projects, a build file is automatically generated for each of the one or more dependent projects. The build file calls importing targets within each of the one or more dependent projects. Then, the current project and the one or more dependent projects are automatically imported into the application developer workspace to form a created current project. The created current project is created without launching an application developer application. In addition, the created current project is stored in a source code control repository.

17 Claims, 6 Drawing Sheets

OTHER PUBLICATIONS

Hatcher, E., et al., Java Development with Ant [online], Greenwich, CT, Manning Publications, 2003 [retrieved Nov. 4, 2011], Retrieved from Internet: <http://cognitrn.psych.indiana.edu/busey/temp/ant.pdf>, pp. iii, iv, xxix, 4-6, 70, 111-133, 135-139, 245.*

Loughran, S., et al., Ant in Action [online], Greenwich, CT, Manning Publications, 2007 [retrieved Apr. 6, 2012], Retrieved from Internet <http://academic.safaribooksonline.com/9781932394801>, pp. i, ii, 297-319.*

Massol, V., et al., Better Builds with Maven [online], 2006 [retrieved Apr. 12, 2012], Retrieved from Internet: <http://www.topazproject.org/trac/attachment/wiki/MavenInfo/BetterBuildsWithMaven.pdf?format=raw>, pp. 1-281.*

Stocq et al., "A Domain Model—Driven Approach for Producing User Interfaces to Multi-Platform Information Systems", ACM 2004, AVI'04 May 2004, Gallipoli Italy, pp. 395-398.

Mandviwalla et al., "Studying the Integration of Technology with Collaborative Object Workspaces (COWS)", SIGCPR 97 San Francisco CA USA, 1997 ACM, pp. 181-186.

* cited by examiner

```
<?xml version="1.0" encoding="UTF-8" ?>
<!-- =========================================================== -->
<!-- THIS FILE IS GENERATED AUTOMATICALLY BY THE CUSTOMIZED ANT TASK -->
<!-- adddepends. IT WILL CALL THE radbuild DEFINED IN THE BUILD FILE -->
<!-- build.xml IN THE DEPENDED PROJECT. -->
<!-- =========================================================== -->
- <project name ="raddependsprj">
  - <target name = "raddepends_build_">
      <ant dir="../dependent1" inheritAll="false" target="radbuild"/>
    </target>
  </project>
```

```
- <target name = "raddepends_">      ← 414
      <ant antfile="RADDdepends.xml"target="raddepends_build_" />
    </target>
<!-- =========================================================== -->
<!-- THE FOLLOWING IS THE DEFAULT TARGET. -->
<!-- -->
<!-- =========================================================== -->
    <target name = "usage"/>   ← 416
</project>
```

```xml
- <project name ="common" default="usage" basedir=".">
    <description>The common build targets for creating the RAD workspace.</description>
    <!-- ======================================== -->
    <!-- INITIALIZE THE BUILD ENVIRONMENT          -->
    <!-- ======================================== -->
  - <target name ="radinit_"> ~402
      <echo message="Entering the project ${ant.project.name}" />
      <taskdef resource="com/ibm/serv/odirm/buildtools/RADBuildTasks.properties" />
      <radinit />
      <property name="build.pgm" value="${dv2path}" />
      <property name="common.build.pgm"
        value="${dv2path}/common.pgm/cmn_odirm_server.serv/BuildTools/common/build/" />
      <property name="cmvc.pgm" value="${basedir}/../${ant.project.name}" />
      <property name="rad.project.location" value="${ws.location}/${ant.project.name}" />
      <property name="runant.dir"
        value="${rad.home}/rwd/eclipse/plugins/com.ibm.etools.j2ee.ant_6.0.0" />
    - <fileset id="cmvc.src" dir="${basedir}" includes="*Module/**/*.*,META-
        INF/**/*.*,com/**/*.java,.settings/*">
        <include name=".project" />
        <include name=".classpath" />
        <include name=".runtime" />
        <include name=".modulemaps" />
      </fileset>
    </target>
    <!-- ======================================== -->
    <!-- THE FOLLOWING IS USED TO PREPARE THE WORKSPACE. -->
    <!-- THE FILES IN cmvc ARE COPIED TO THE WORKSPACE   -->
    <!-- DIRECTORY                                 -->
    <!-- ======================================== -->
  - <target name="radprepare_" depends="radinit_"> ~404
      <echo message="the RAD project location is ${rad.project.location}" />
      <delete dir="${rad.project.location}" />
      <mkdir dir="${rad.project.location}/gen/src" />
      <mkdir dir="${rad.project.location}/bin" />
    - <copy todir="${rad.project.location}" preservelastmodified="true">
        <fileset refid="cmvc.src" />
      </copy>
    </target>
    <!-- ======================================== -->
    <!-- THE FOLLOWING IS THE TARGET USED TO IMPORT -->
    <!-- THE PROJECT INTO RAD. THIS TARGET IS CALLED BY -->
    <!-- runant_ target.                            -->
    <!-- ======================================== -->
    <target name="importprj" depends="radinit_,radprepare_"> ~406
      <echo message="name=${ant.project.name}, location=${rad.project.location}" />
      <projectImport ProjectName="${ant.project.name}"
        ProjectLocation="${rad.project.location}" />
      <eclipse.refreshLocal resource="${ant.project.name}" depth="infinite" />
```

FIG. 4B
400

```xml
<!--workspaceBuild failonerror="true" buildtype="full" /-->
</target>
<!-- ========================================== -->
<!-- THE FOLLOWING IS USED TO RUN THE RunAnt        -->
<!-- APPLICATION TO CALL importprj TARGET DEFINED   -->
<!-- ABOVE.                                         -->
<!-- ========================================== -->
- <target name="runant_" >  ~ 408
    <echo message="name=${ant.project.name},location=${rad.project.location}" />
  - <exec executable="${rad.home}/eclipse/jre/bin/java.exe">
      <arg value="-DSTUDIO.DIR=${rad.home}" />
      <arg value="-DSTUDIO.RUNANT=${radant.dir}" />
      <arg value="-DSTUDIO.WORKSPACE=${ws.location}" />
      <arg line="-classpath
        ${rad.home}/rwd/eclipse/plugins/com.ibm.wtp.server.core_3.0.0/servercore.jar;${rad.hon
        launcher.jar;${rad.home}/eclipse/plugins/org.eclipse.jdt.core_3.0.1.1/jdtCompilerAdapter.j
      <arg value="org.eclipse.core.launcher.Main" />
      <arg line="-application com.ibm.etools.j2ee.ant.RunAnt" />
      <arg line="-data ${ws.location}" />
      <arg line="-buildfile ${cmvc.pgm}/build.xml" />
      <arg line="importprj" /> ~ 418
    </exec>
</target>
<!-- - - - - - - - - - - - - - - - - - - - - - - - - -->
<!-- THE FOLLOWING IS USED TO GENERATE ONE FILE:     -->
<!-- RADDepends.xml.                                 -->
<!--                                                 -->
<!-- ========================================== -->
- <target name="generateDepBuildFile_"> ~ 410
    <echo message="the dv2path=${dv2path}" />
    <taskdef resource="com/ibm/serv/odirm/buildtools/RADBuildTasks.properties" />
    <echo message="the common build dir=${common.build.pgm}" />
    <echo message="the project dir=${cmvc.pgm}" />
    <adddepends dir="${common.build.pgm}" prjdir="${cmvc.pgm}"
        templatename="RADDepends.xml" />                              } 420
</target>
<!-- ========================================== -->
<!-- THE FOLLOWING IS THE MAIN TARGET TO RUN THE RAD -->
<!-- BUILD.                                          -->
<!--                                                 -->
<!-- ========================================== -->
<target name="createprjs" ~ 412
    depends="radinit_,generateDepBuildFile_,raddepends_,runant_" />
<!-- ========================================== -->
<!-- THE FOLLOWING IS USED TO CREATE THE DEPENDED    -->
<!-- PROJECTS IN THE WORKSPACE.                      -->
<!--                                                 -->
<!-- ========================================== -->
```

```xml
<project name ="radimport" default="usage" basedir=".">
<description>automatically import the current project and its dependent projects
    into RAD work space.</description>
<!-- ================================================== -->
<!-- THE FOLLOWING IS REQUIRED FOR ADDRESSABILITY        -->
<!-- TO CMVC ANT TASKS.                                  -->
<!-- ================================================== -->
<!-- DO NOT MODIFY                                       -->
<!-- ================================================== -->
<taskdef resource="com/ibm/bldeserver/EBTdv2anttasks.properties"/>  ~502
<import file="./RADCommon.xml" />

<!-- ================================================== -->
<!-- CREATE THE PROJECT AND THE DEPENDED PROJECTS        -->
<!-- IN THE RAD WORKSPACE.  THE TARGET createprjs        -->
<!-- IS DEFINED IN RADCommon.xml                         -->
<!-- ================================================== -->
<target name = "radbuild" depends="createprjs" />  ~504

<!-- ================================================== -->
<!-- THE BUILD TARGET IS USED TO BUILD AND PACKAGE       -->
<!-- THE FILES FOR THESE PROJECTS.                       -->
<!-- ================================================== -->
<target name="build" depends="init_,depends_build_,current_,compile_,run_"/>  ~506
<target name="depends_build_" />
<target name="init_" />
<target name="current_" />
<target name="compile_" />
<target name="run_" />
</project>
```

*FIG. 5*

CREATING PROJECTS IN A RATIONAL APPLICATION DEVELOPER WORKSPACE

BACKGROUND OF THE INVENTION

1. Field of the Invention

The present invention relates generally to an improved data processing system. More specifically, the present invention is directed to a computer implemented method, system, and computer usable program code for automatically creating projects in a rational application developer workspace.

2. Description of the Related Art

In a typical software development environment, source code is stored in a source code control repository. This source code control repository may, for example, be a configuration management version control (CMVC) or a concurrent versioning system (CVS). CMVC and CVS keep track of all work and all changes in a set of files, typically in the implementation of a software project, and allow developers to collaborate.

Developers use integrated development environment (IDE) tools, such as Rational Application Developer (RAD), formerly known as WebSphere® Studio Application Developer (WSAD), to modify source code during application development cycles. RAD is an IDE software application that provides comprehensive facilities for Java™-based application development. A developer may use RAD to visually design, construct, test, and deploy, for example, Web services, portals, and Java 2 Enterprise Edition (J2EE®) applications.

In general, a developer extracts source code from the source code control repository, such as the CMVC or CVS, creates projects in a RAD workspace, imports source code, and resolves all dependent projects and libraries. However, for various reasons during the application development cycle, a developer may often need to clean up the RAD workspace and recreate projects. As a result, the entire application development process may become very tedious, time consuming, and error prone. In addition, each developer in a team of developers working on the same software product may be required to duplicate the same application development process steps, which wastes valuable time.

A current solution to these problems is a partially automatic process known as another neat tool (ANT). ANT is an Apache Software Foundation project and is open source software. Apache ANT is a software tool for building and packaging applications based on Java™. ANT uses extensible markup language (XML) to describe the build process and its dependencies. By default, an XML build file is named build.xml. A build file contains a project, which defines one or more targets. A target is a set of tasks. An ANT task is a piece of code, or a command, that may be executed to compile and package the Java™-based applications.

A developer writes ANT build files and imports them into an application developer "tool" project. Basically, the tool project contains all of the required ANT macros to create other projects and their depended projects in the RAD workspace. Using this current solution, a developer has to create the tool project in the RAD workspace first. Then, the developer may create other projects by running the build targets in the build files using the ANT macros in the tool project.

However, this current solution has drawbacks. One drawback is that when creating a new workspace, a developer has to first create the tool project to import all the ANT build files. Another drawback is that the ANT macros defined in the ANT build files may become complicated and difficult to maintain. A third drawback is that RAD workspace must always be running when creating the projects. A fourth drawback is that the CMVC or CVS build and the project imports may not be seamlessly combined into one build.xml file.

Therefore, it would be beneficial to have a computer implemented method, system, and computer usable program code for automatically creating Java™-based projects in a RAD workspace by building a bridge between the source code control repository (i.e., a CMVC or CVS) and the RAD workspace.

SUMMARY OF THE INVENTION

Illustrative embodiments provide a computer implemented method, system, and computer usable program code for automatically creating a current project in an application developer workspace. In response to reading a project file for the current project, it is automatically determined whether the current project has one or more dependent projects based on data contained within the project file. In response to determining that the current project does have one or more dependent projects, a build file is automatically generated for each of the one or more dependent projects. The build file calls importing targets within each of the one or more dependent projects. Then, the current project and the one or more dependent projects are automatically imported into the application developer workspace to form a created current project. The created current project is created without launching an application developer application. In addition, the created current project is stored in a source code control repository.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an exemplary illustration of a build file that is automatically generated by a customized ANT task for calling an import target within a depended project in accordance with an illustrative embodiment;

FIG. 4A, FIG. 4B, and FIG. 4C is an exemplary illustration of a common build file for initializing an ANT build environment, generating a dependency build file, calling each import target within all depended projects, and importing a project into a RAD workspace in accordance with an illustrative embodiment; and FIG. 5 is an exemplary illustration of a build file for including the common build file described in FIGS. 4A-4C and calling the importing target "createpjs" to create a project and all of its depended projects in a RAD workspace in accordance with an illustrative embodiment.

DETAILED DESCRIPTION OF THE PREFERRED EMBODIMENT

Figure 1:
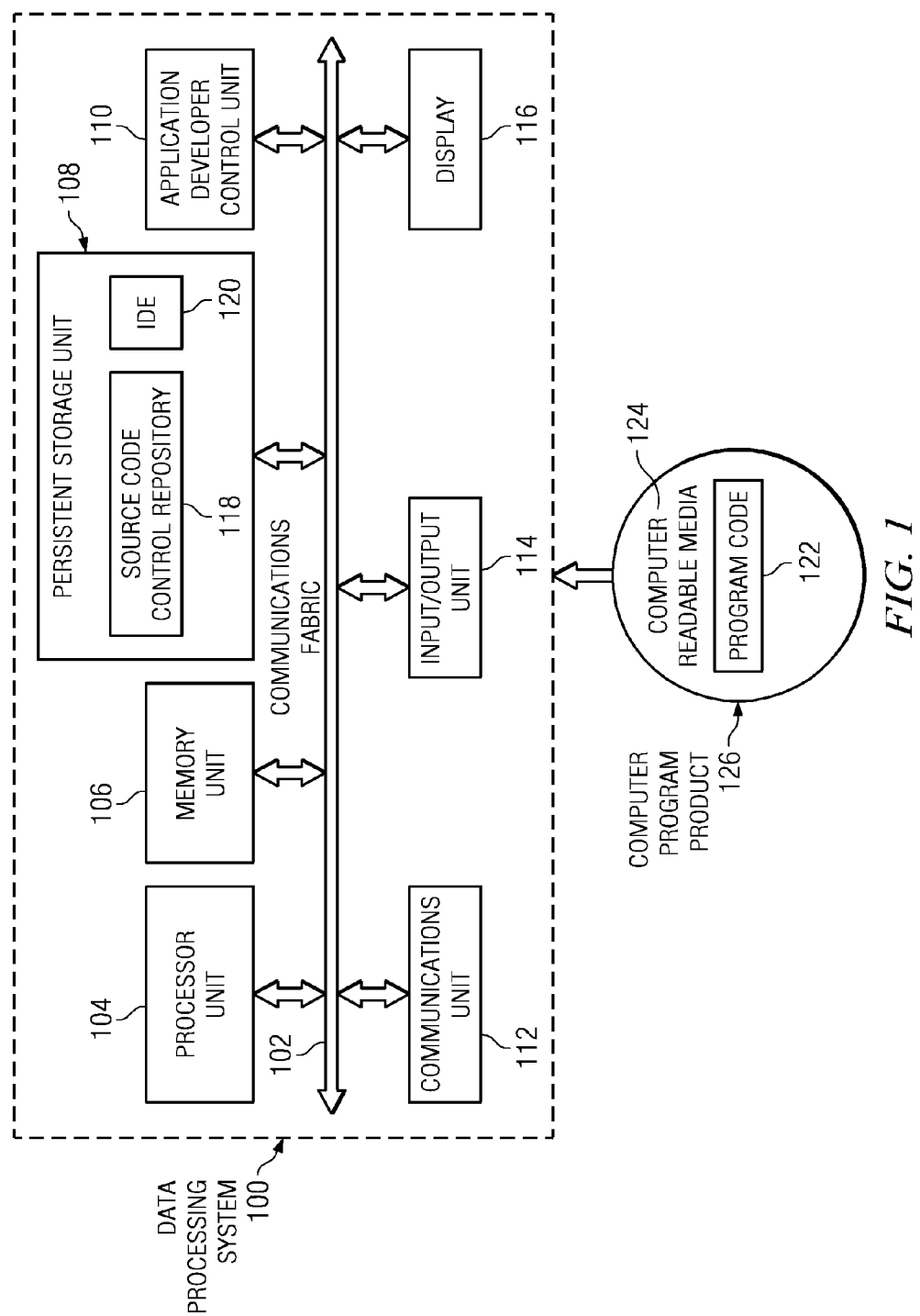
FIG. 1 is a block diagram of a data processing system in which illustrative embodiments may be implemented.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to data processing environments in which different illustrative embodiments may be implemented. Many modifications to the depicted environment may be made.

FIG. 1 depicts a block diagram of a data processing system in which illustrative embodiments may be implemented. In this illustrative example, data processing system 100 includes communications fabric 102, which provides communications between processor unit 104, memory unit 106, persistent storage unit 108, application developer control unit 110, communications unit 112, input/output (I/O) unit 114, and display unit 116.

Processor unit 104 serves to execute instructions for software that may be loaded into memory unit 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory unit 106, in these examples, may be, for example, a random access memory (RAM). Persistent storage unit 108 may take various forms depending on the particular implementation. For example, persistent storage unit 108 may contain one or more components or devices, such as a hard drive, a flash memory, a rewritable optical disk, a rewritable magnetic tape, or some combination of the above. The media used by persistent storage unit 108 may also be removable. For example, a removable hard drive may be used for persistent storage unit 108.

In this exemplary illustration, persistent storage unit 108 includes source code control repository 118 and IDE 120. Source code control repository 118 may, for example, be a CMVC or a CVS. IDE 120 may, for example, be a RAD plugin software component. It should be noted that source code control unit 118 and IDE 120 may reside in the same or in different persistent storage devices. In addition, source code control unit 118 and IDE 120 may reside in different data processing systems.

Application developer control unit 110 is a component that controls the process for software application development. In particular, application developer control unit 110 controls the automatic creation of Java™ projects in IDE 120. It should be noted that application developer control unit 110 may be implemented entirely as software, entirely as hardware, or as a combination of both software and hardware. Further, a user, such as a system administrator or application developer, may enable and disable application developer control unit 110 independently of other data processing system 100 features and components.

Communications unit 112, in these examples, provides for communications with other data processing systems or devices. In these examples, communications unit 112 is a network interface card. Communications unit 112 may provide communications through the use of either or both physical and wireless communications links.

Input/output unit 114 allows for input and output of data with other devices that may be connected to data processing system 100. For example, input/output unit 114 may provide a connection for user input through a keyboard and mouse. Further, input/output unit 114 may send output to a printer. Display unit 116 provides a mechanism to display information, such as an automatically generated Java™ project, to the user for review.

Instructions for an operating system and applications or programs are located on persistent storage unit 108. These instructions may be loaded into memory unit 106 for execution by processor unit 104. The processes of different illustrative embodiments may be performed by processor unit 104 using computer implemented instructions, which may be located in a memory, such as memory unit 106. These instructions are referred to as, program code, computer usable program code, or computer readable program code that may be read and executed by a processor in processor unit 104. The program code in the different illustrative embodiments may be embodied on different physical or tangible computer readable media, such as memory unit 106 or persistent storage unit 108.

Program code 122 is located in a functional form on computer readable media 124 and may be loaded onto or transferred to data processing system 100 for execution by processor unit 104. Program code 122 and computer readable media 124 form computer program product 126 in these examples. In one example, computer readable media 124 may be in a tangible form, such as, for example, an optical or magnetic disc that is inserted or placed into a drive or other device that is part of persistent storage unit 108 for transfer onto a storage device, such as a hard drive that is part of persistent storage unit 108. In a tangible form, computer readable media 124 may also take the form of a persistent storage, such as a hard drive or a flash memory that is connected to data processing system 100. The tangible form of computer readable media 124 is also referred to as computer recordable storage media.

Alternatively, program code 122 may be transferred to data processing system 100 from computer readable media 124 through a communications link to communications unit 112 and/or through a connection to input/output unit 114. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different illustrative embodiments may be implemented. The different illustrative embodiments may be implemented in a data processing system including components in addition to, or in place of, those illustrated for data processing system 100. Other components shown in FIG. 1 may be varied from the illustrative examples shown.

For example, a bus system may be used to implement communications fabric 102 and may comprise one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory unit 106 or a cache, such as found in an interface and memory controller hub, which may be present in communications fabric 102.

Illustrative embodiments provide a computer implemented method, system, and computer usable program code for automatically creating Java™-based projects in a RAD workspace by building a bridge between the CMVC or CVS source code repository and the RAD workspace. In response to reading a project file for the current project, a customized "adddepends" ANT task invoked in a "RADCommon.xml" build file automatically determines whether the current Java™-based project has one or more dependent projects based on data contained within the project file. In response to determining that the current Java™-based project does have one or more dependent projects, the customized "adddepends" ANT task automatically generates a "RADDependent.xml" build file for each of the one or more dependent projects. The "RADDependent.xml" build file calls importing targets within each of the one or more dependent projects.

Then, the "RADCommon.xml" build file automatically imports the current project and the one or more dependent projects into the RAD workspace to form a created current project. The created current project is created without launching the RAD. In addition, the created current project is stored in the RAD workspace.

Illustrative embodiments automatically create Java™-based projects in a RAD workspace by utilizing an ANT build file that is common for creating any projects. This common ANT build file, called "RADCommon.xml", includes special tasks that are written to dynamically generate a build-time build file that calls depended project build targets. Each project's build file only needs to include RADCommon.xml, so that the RADCommon.xml build file may be used to create the project in the RAD workspace.

Thus, developers only need run the project's build file at command line in the project source directory. The project, along with all of its depended projects, is automatically created in a specified RAD workspace directory without first launching RAD. After the projects are created, RAD is launched with the specified RAD workspace directory. All of the projects created by the build command are now available in RAD. Consequently, illustrative embodiments do not require a running RAD application to create projects in the RAD workspace. In addition, illustrative embodiments automatically generate a build file for building the project and its depended projects.

As a result, illustrative embodiments do not require any manual steps to create projects in the RAD workspace. Thus, illustrative embodiments simplify the process of creating projects in RAD and save valuable time. Also, illustrative embodiments may seamlessly combine the CMVC or CVS build and project imports into one build.xml file. Furthermore, a developer only needs to update ANT custom tasks in the build file if more features need to be added to an illustrative embodiment.

For each project, there is one build.xml file. Illustrative embodiments use the build.xml file for the CMVC or CVS build and for importing the project, along with its depended projects, into the RAD workspace. However, these two processes are found in two different targets. For example, in the build.xml file there is a "build" target for building and packaging the CMVC or CVS files and a "radbuild" target for importing the projects into the RAD workspace.

Illustrative embodiments use a common RAD build file for importing the projects into the workspace. In the common RAD build file, the "creatprjs" target depends on a "radinit_" target, a "generateDepBuildFile_" target, a "radDepends_" target, and a "runant_" target, in this specific order. In addition, the "runant_" target depends on an "importprj" target, which in turn depends on a "radprepare" target.

Illustrative embodiments use a "radinit_" target to initialize the ANT build environment. Also, illustrative embodiments use a "generateDepBuildFile_" target to determine depended projects of the current project by reading the content of a ".project" file found in the CMVC or CVS and to dynamically generate one file that include the ANT targets for calling the depended projects build files. The dynamically generated file is used for calling the importing target in depended projects.

Illustrative embodiments automatically generate the "RADDepends.xml" build file. The "radDepends_" target calls the ANT target in the generated file in order to call the build targets in the depended projects so that the depended projects may be imported into the RAD workspace. This depended project importing is a recursive process. In other words, if the depended projects depend on other projects, the projects at the lowest level of the dependency chain are imported into the RAD workspace first, then projects at the next highest level of the dependency chain are imported, and so on.

The "runant_" target imports the current project into the RAD workspace using the "importprj" target and the "radprepare_" target. The build class path of each project is automatically set, as well, according to the contents of the ".classpath" file in the CMVC or CVS.

When a new project needs to be imported into the RAD workspace, only two lines of code need to be added within the new project's build.xml file for the CMVC or CVS build, which are shown below:
1) <import file="../../cmn_odirm_server.serv/BuildTools/common/build/radcommon.xml"/>; and
2) <target name="radbuild" depends="createprjs"/>.
After adding these two lines of code within the new project's build.xml file for the CMVC or CVS build, when the developer runs "ant radbuild", the current project and all of its depended projects are imported into the RAD workspace. Consequently, illustrative embodiments simplify the application build development process and save developers a lot of time by seamlessly combining the CMVC or CVS build and the project importing process together into one build.xml file.

Figure 2:
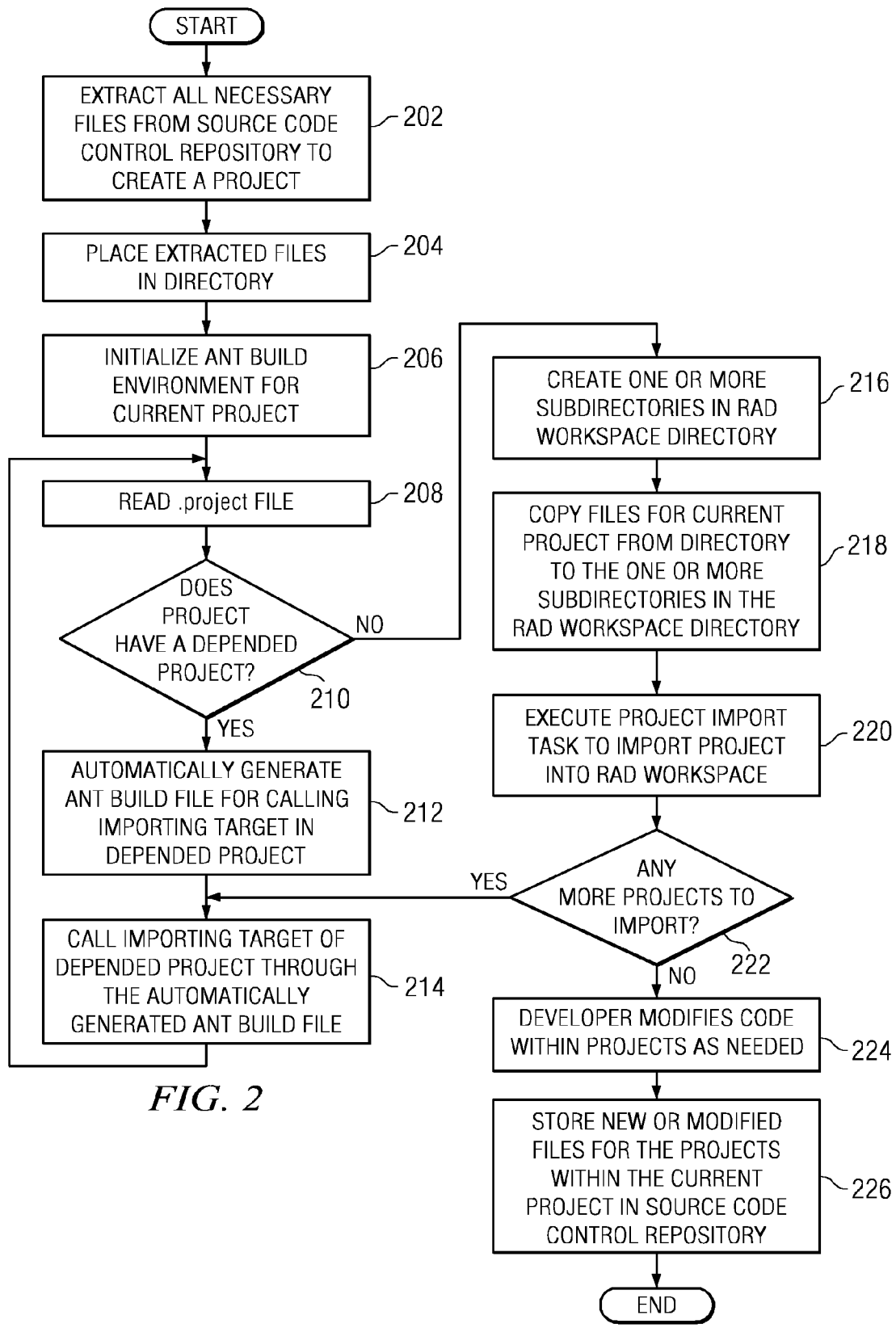
FIG. 2 is a flowchart illustrating an exemplary process for automatically creating a project in a RAD workspace in accordance with an illustrative embodiment.

With reference now to FIG. 2, a flowchart illustrating an exemplary process for automatically creating a project in a RAD workspace is shown in accordance with an illustrative embodiment. The process shown in FIG. 2 may be implemented in an application developer control unit, such as, for example, application developer control unit 110 in FIG. 1.

The process begins when the application developer control unit automatically extracts all necessary files from a source code control repository, such as source code control repository 118 in FIG. 1, to create a project, such as a Java™ project, (step 202). Alternatively, a developer may manually extract all the necessary files from the source code control repository to create the project. Then, the application developer control unit places the extracted files in a directory (step 204). The directory may, for example, be named the "dir1" directory.

Afterward, the application developer control unit utilizes a "radinit_" target in a RADCommon.xml build file to initialize an ANT build environment for the current project (step 206). The RADCommon.xml build file is a common ANT build file for importing the current project, along with its depended projects, into a workspace within a RAD, such as IDE 120 in FIG. 1. Subsequently, the application developer control unit utilizes a customized "adddepends" ANT task in the RADCommon.xml build file to read a project file (step 208). The customized "adddepends" ANT task may, for example, be <adddepends dir="${common.build.pgm}" prjdir="${cmvc.pgm}" templatename="RADDepends.xml"/>.

The ".project" file is created with any RAD project and includes data regarding any and all dependent projects. When a project is first created with RAD, a ".project" file is automatically created as part of the project and is accordingly updated during the development process. The ".project" file, together with other code for this project, needs to be created in the CMVC or other source code control repository.

Further, the application developer control unit uses the customized "adddepends" ANT task to make a determination as to whether the project has one or more depended projects based on the information included in the ".project" file (step 210). If the project does have one or more depended projects, yes output of step 210, then the application developer control unit uses the customized "adddepends" ANT task to automatically generate an ANT build file, such as "RADDepends.xml", for calling an importing target in a depended project (step 212).

Then, the application developer control unit calls the importing target, such as "radbuild" in the automatically generated ANT build file, of the first depended project (step 214). Afterward, the process returns to step 208 where the customized "adddepends" ANT task reads the ".project" file to automatically generate the dependency build file. It should be noted that steps 208 through 214 recursively occur until all depended projects within the current project are found and an ANT build.xml file is automatically generated to import the depended projects.

Returning again to step 210, if the project does not have one or more depended projects (i.e., there is no ant task call in the generated build file, such as "RADDepends.xml"), then the application developer control unit creates one or more subdirectories in a RAD workspace directory (step 216). After creating the one or more subdirectories in step 216, the application developer control unit copies the files for the current project from the "dir1" directory to the one or more subdirectories within the RAD workspace directory (step 218). Subsequently, the application developer control unit executes a project import task to import a project into the RAD workspace (step 220). The project import task may, for example, be a "projectimport" ANT task. In addition, the application developer control unit may execute the "projectimport" ANT task using a "RunAnt" application within a RAD plugin.

After importing the project into the RAD workspace in step 220, the application developer control unit makes a determination as to whether any more projects need to be imported into the RAD workspace (step 222). If more projects need to be imported into the RAD workspace, yes output of step 222, then the process returns to step 214 where the application developer control unit executes the ANT task to call the importing target, such as "radbuild" in the next depended project. It should be noted that steps 208 and 222 recursively occur until the current project and all its depended projects are imported into the RAD workspace.

If no more projects need to be imported into the RAD workspace, no output of step 222, then a developer may modify or add to the code within the projects as needed with RAD IDE (step 224). After the code is complete, the application developer control unit stores the new or modified files for the projects within the current project in the source code control repository (step 226). Also, the application developer control unit may output the current project to a display unit, such as display unit 116 in FIG. 1, or to a printer for the developer to review. The process terminates thereafter.

With reference now to FIG. 3, an exemplary illustration of a build file that is automatically generated by a customized ANT task for calling an import target within a depended project is depicted in accordance with an illustrative embodiment. Illustrative embodiments may locate exemplary build file 300 within, for example, an application developer control unit, such as application developer control unit 110 in FIG. 1. However, illustrative embodiments are not limited to locating build file 300 within the application developer control unit. Illustrative embodiments may locate build file 300 in any component, such as, for example, memory unit 106, persistent storage unit 108, source code control repository 118, or IDE 120 in FIG. 1, within the data processing system.

Build file 300 is an example of a "RADDepends.xml" build file. In addition, it should be noted that build file 300 is only intended as an example of one specific type of build file that may be utilized by illustrative embodiments. In other words, illustrative embodiments may utilize a plurality of different build files to accomplish processes of illustrative embodiments. Further, a customized "adddepends" ANT task automatically generates build file 300. The application developer control unit uses build file 300 to call an import target within a depended project.

With reference now to FIG. 4A, FIG. 4B, and FIG. 4C, an exemplary illustration of a common build file for initializing an ANT build environment, generating a dependency build file, calling each import target within all depended projects, and importing a project into a RAD workspace is depicted in accordance with an illustrative embodiment. Illustrative embodiments may locate exemplary build file 400 within, for example, an application developer control unit, such as application developer control unit 110 in FIG. 1. Build file 400 is an example of a "RADCommon.xml" build file and is common and shared by all build files. In addition, build file 400 may be included in all project build files and includes the common build targets for creating a RAD workspace.

In this example, build file 400 includes targets 402, 404, 406, 408, 410, 412, 414, and 416. However, it should be noted that build file 400 is only shown for exemplary purposes and is not intended as a limitation to illustrative embodiments. Build file 400 may include more or fewer targets as necessary to accomplish processes of alternative embodiments.

The application developer control unit uses target 402 to initialize the ANT build environment. Target 404 prepares the RAD workspace by copying the files in the source code control repository (i.e., the CMVC or CVS) to the RAD workspace directory. Target 406, which is an "importprj" target, imports the current project into the RAD workspace. Target 406 is called by target 408. Target 408, which is a "runant_" target, executes a RunAnt application to call target 406. Target 408 includes task 418, which is the task that calls target 406 to import the project into the RAD workspace.

Target 410 automatically generates a "RADDepends.xml" build file. The application developer control unit uses the "RADDepends.xml" build file for importing depended projects. In addition, target 410 includes task 420. Task 420 is a customized "adddepends" ANT task that the application developer control unit uses to read the ".project" files of projects, to automatically determine whether depended projects exist for each of the projects based on data contained within the ".project" files, and to automatically create the "RADDepends.xml" build file based on a template file for each depended project. Target 412 is the main target that runs the RAD build. Target 414 creates the depended projects in the RAD workspace. Finally, target 416 is a default target.

With reference now to FIG. 5, an exemplary illustration of a build file for including the common build file described in FIGS. 4A-4C and calling the importing target "createpjs" to create a project and all of its depended projects in a PAD workspace is depicted in accordance with an illustrative embodiment. Illustrative embodiments may locate exemplary build file 500 within, for example, an application developer control unit, such as application developer control unit 110 in FIG. 1. Build file 500 is an example of a "build.xml" file. The build file is used for both building the files from the source code control repository and importing the project and its depended projects into a RAD workspace.

The application developer control unit uses build file 500 to automatically import the current project and all its dependent projects into the RAD workspace. Build file 500 includes task 502, target 504, and target 506. However, it should be noted that build file 500 is only shown for exemplary purposes and is not intended as a limitation to illustrative embodiments. Build file 500 may include more or fewer targets and tasks as necessary to accomplish processes of alternative embodiments.

The application developer control unit uses task 502 to gain accessibility to the customized ANT task "adddepends". Target 504, which is a "radbuild" target, creates the current project and all its depended projects in the RAD workspace. A "RADCommon.xml" build file, such as build file 400 in FIGS. 4A-4C, defines the "createprjs" target, such as target 412 in FIG. 4B. Target 506, which is a "build" target, builds and packages the files for the current project and all its depended projects.

Thus, illustrative embodiments provide a computer implemented method, system, and computer usable program code for automatically creating Java™ projects in a RAD workspace by building a bridge between the CMVC or CVS source code control repository and the RAD workspace. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for automatically creating a current project in a RATIONAL application developer workspace, the computer implemented method comprising:

extracting, by a computer, files that are used to create the current project from a configuration management version control software package to form extracted files;

placing, by the computer, the extracted files in a source code control repository directory;

creating, by the computer, one or more subdirectories in a RATIONAL application developer workspace directory;

copying, by the computer, the extracted files in the source code control repository directory into the one or more subdirectories in the RATIONAL application developer workspace directory;

initializing, by the computer, an ANT build environment for the current project;

responsive to reading a project file for the current project, determining automatically, by the computer, if the current project has one or more dependent projects based on data contained within the project file, wherein a customized ANT task that automatically generates an ANT build file for each of the one or more dependent projects is used to read the project file for the current project and then determine if the current project has one or more dependent projects based on the data contained within the project file;

responsive to determining that the current project does have one or more dependent projects, generating automatically, by the computer, the ANT build file for each of the one or more dependent projects using the customized ANT task, wherein the ANT build file is automatically generated for each of the one or more dependent projects based on a template file for each of the one or more dependent projects, and wherein the ANT build file calls importing targets within each of the one or more dependent projects;

importing automatically, by the computer, the current project and the one or more dependent projects into the RATIONAL application developer workspace of a RATIONAL application developer application by calling the importing targets within the ANT build file of each of the one or more dependent projects to form a created current project, wherein the RATIONAL application developer workspace is an integrated development environment, and wherein the created current project is created within the RATIONAL application developer workspace without launching the RATIONAL application developer application; and storing, by the computer, the created current project in the configuration management version control software package.

2. The computer implemented method of claim 1, wherein the current project is a JAVA-based project.

3. The computer implemented method of claim 1, wherein the ANT build file uses extensible markup language.

4. The computer implemented method of claim 1, wherein the customized ANT task is located in a common ANT build file, and wherein the common ANT build file is a RADCommon.xml build file.

5. The computer implemented method of claim 4, wherein the RADCommon.xml build file automatically imports the current project and the one or more dependent projects into the RATIONAL application developer workspace.

6. The computer implemented method of claim 1, wherein the customized ANT task is a customized adddepends ANT task.

7. The computer implemented method of claim 1, wherein the current project includes a plurality of build files.

8. A computer program product stored on a computer readable storage device having computer usable program code embodied thereon that is executable by a computer for automatically creating a current project in a RATIONAL application developer workspace, the computer program product comprising:

computer usable program code for extracting files that are used to create the current project from a configuration management version control software package to form extracted files;

computer usable program code for placing the extracted files in a source code control repository directory;

computer usable program code for creating one or more subdirectories in a RATIONAL application developer workspace directory;

computer usable program code for copying the extracted files in the source code control repository directory into the one or more subdirectories in the RATIONAL application developer workspace directory;

computer usable program code for initializing an ANT build environment for the current project;

computer usable program code for determining automatically if the current project has one or more dependent projects based on data contained within a project file for the current project in response to reading the project file, wherein a customized ANT task that automatically generates an ANT build file for each of the one or more dependent projects is used to read the project file for the current project and then determine if the current project has one or more dependent projects based on the data contained within the project file;

computer usable program code for generating automatically the ANT build file for each of the one or more dependent projects using the customized ANT task in response to determining that the current project does have the one or more dependent projects, wherein the ANT build file is automatically generated for each of the one or more dependent projects based on a template file for each of the one or more dependent projects, and wherein the ANT build file calls importing targets within each of the one or more dependent projects;

computer usable program code for importing automatically the current project and the one or more dependent projects into the RATIONAL application developer workspace of a RATIONAL application developer application by calling the importing targets within the ANT build file of each of the one or more dependent projects to form a created current project, wherein the RATIONAL application developer workspace is an integrated development environment, and wherein the created current project is created within the RATIONAL application developer workspace without launching the RATIONAL application developer application; and computer usable program code for storing the created current the configuration management version control software package.

9. The computer program product of claim 8, wherein the current project is a JAVA-based project.

10. The computer program product of claim 8, wherein the ANT build file uses extensible markup language.

11. The computer program product of claim 8, wherein the customized ANT task is located in a common ANT build file, and wherein the common ANT build file is a RADCommon.xml build file.

12. The computer program product of claim 11, wherein the RADCommon.xml build file automatically imports the current project and the one or more dependent projects into the RATIONAL application developer workspace.

13. The computer program product of claim 8, wherein the customized ANT task is a customized adddepends ANT task.

14. The computer program product of claim 8, wherein the current project includes a plurality of build files.

15. A computer system for automatically creating a current project in a RATIONAL application developer workspace, the computer system comprising:

a storage device, wherein the storage device stores computer usable program code; and a processor, wherein the processor executes the computer usable program code to:

extract files that are used to create the current project from a configuration management version control software package to form extracted files;

place the extracted files in a source code control repository directory;

create one or more subdirectories in a RATIONAL application developer workspace directory;

copy the extracted files in the source code control repository directory into the one or more subdirectories in the RATIONAL application developer workspace directory;

initialize an ANT build environment for the current project;

determine automatically if the current project has one or more dependent projects based on data contained within a project file for the current project in response to reading the project file, wherein a customized ANT task that automatically generates an ANT build file for each of the one or more dependent projects is used to read the project file for the current project and then determine if the current project has one or more dependent projects based on the data contained within the project file;

generate automatically the ANT build file for each of the one or more dependent projects using the customized ANT task in response to determining that the current project does have the one or more dependent projects, wherein the ANT build file is automatically generated for each of the one or more dependent projects based on a template file for each of the one or more dependent projects, and wherein the ANT build file calls importing targets within each of the one or more dependent projects;

import automatically the current project and the one or more dependent projects into the RATIONAL application developer workspace of a RATIONAL application developer application by calling the importing targets within the ANT build file of each of the one or more dependent projects to form a created current project, wherein the RATIONAL application developer workspace is an integrated development environment, and wherein the created current project is created within the RATIONAL application developer workspace without launching the RATIONAL application developer application; and store the created current project the configuration management version control software package.

16. The computer system of claim 15, wherein the current project is a JAVA-based project.

17. The computer system of claim 15, wherein the ANT build file uses extensible markup language.

* * * * *